(12) United States Patent
Keshavaraj

(10) Patent No.: US 6,796,583 B2
(45) Date of Patent: Sep. 28, 2004

(54) AIR BAG TETHER SYSTEM COMPRISING MULTI-SEGMENT TETHERS

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/934,932

(22) Filed: Aug. 22, 2001

(65) Prior Publication Data

US 2002/0056978 A1 May 16, 2002

Related U.S. Application Data

(63) Continuation-in-part of application No. 09/711,418, filed on Nov. 13, 2000.

(51) Int. Cl.[7] .............................................. B60R 21/16
(52) U.S. Cl. ................................................... 280/743.2
(58) Field of Search ............................ 280/743.1, 743.2

(56) References Cited

U.S. PATENT DOCUMENTS

| 4,966,389 | A |   | 10/1990 | Takada .................... 280/743 |
| 5,308,113 | A |   | 5/1994  | Moriset ................. 280/743 A |
| 5,613,708 | A | * | 3/1997  | Bleider et al. ........... 280/743.2 |
| 5,669,632 | A | * | 9/1997  | Johnson et al. .......... 280/743.1 |
| 5,813,696 | A |   | 9/1998  | Hill ....................... 280/743.2 |
| 5,848,805 | A | * | 12/1998 | Sogi et al. ............... 280/743.2 |
| 5,997,037 | A |   | 12/1999 | Hill et al. ............... 280/743.2 |
| 6,086,096 | A | * | 7/2000  | Link et al. .............. 280/743.1 |
| 6,241,283 | B1|   | 6/2001  | Zarazua .................. 280/743.2 |
| 6,254,130 | B1|   | 7/2001  | Jayaraman et al. ...... 280/743.2 |
| 6,302,433 | B1|   | 10/2001 | Ellerbrok et al. ........... 280/729 |
| 6,315,324 | B1|   | 11/2001 | Keshavaraj ............. 280/743.2 |

FOREIGN PATENT DOCUMENTS

| EP | 0 611 683 |   | 8/1994  |              |
| GB | 2243119   | * | 10/1991 | .............. 280/743.2 |

* cited by examiner

Primary Examiner—Eric Culbreth
(74) Attorney, Agent, or Firm—Terry T. Moyer; Charlotte C. Wilson

(57) ABSTRACT

The present invention relates to air bag tethers formed from multiple bias-cut tether segments. Groups of tether segments are attached to the front and rear air bag panels and are then connected to one another to form a functional tether system. This multiple-segment construction, with its bias-cut segments, decreases the amount of fabric that is used in the manufacture of the air bag and tethers, while providing sufficient elongation for the tether system to be functional.

13 Claims, 5 Drawing Sheets

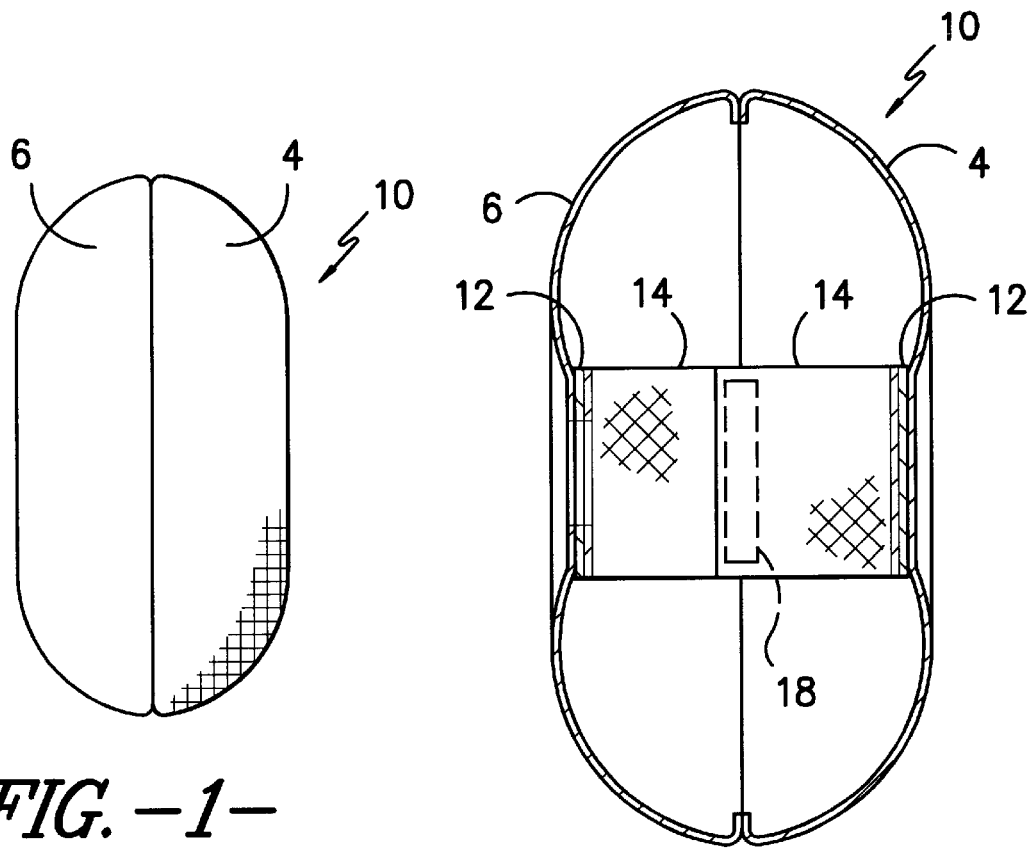
FIG. -1-
FIG. -2-
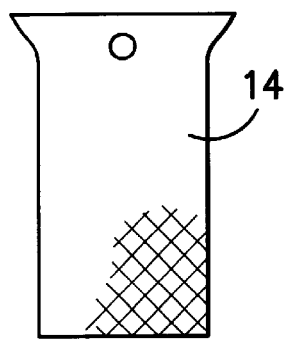
FIG. -3A-
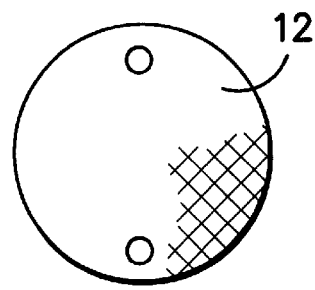
FIG. -3B-

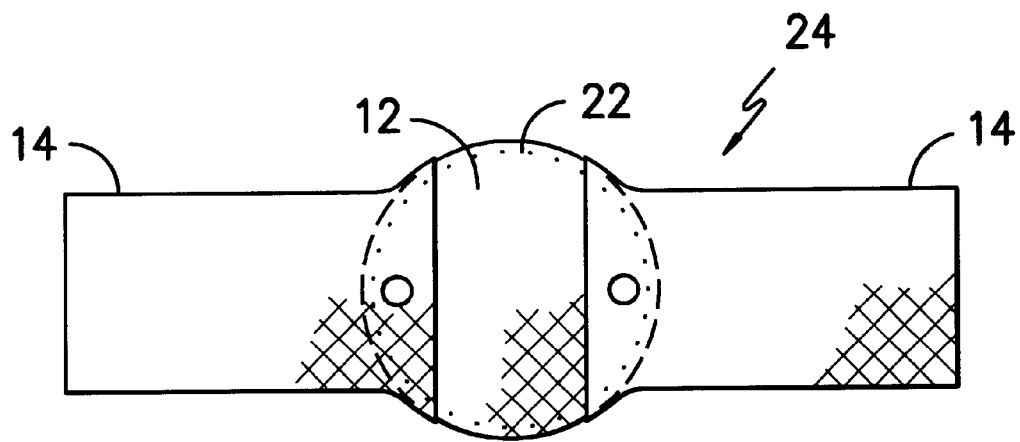
FIG. -3C-
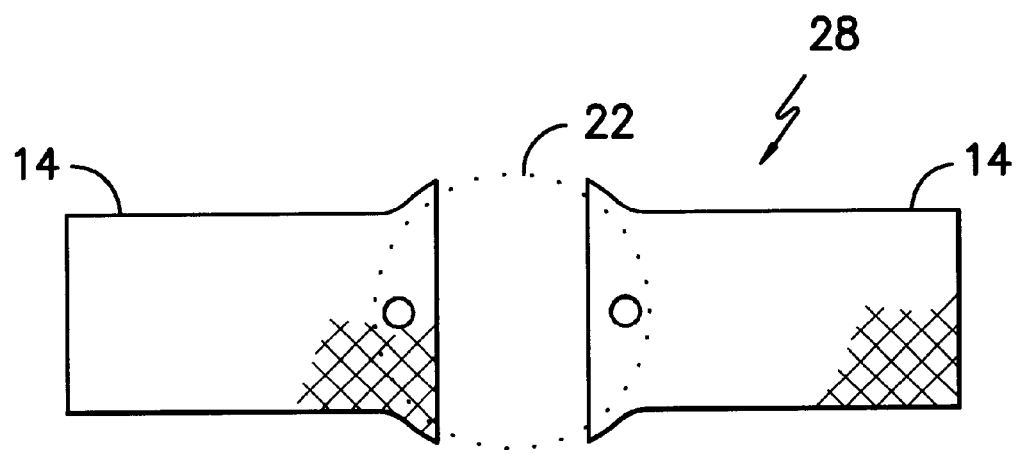
FIG. -3D-

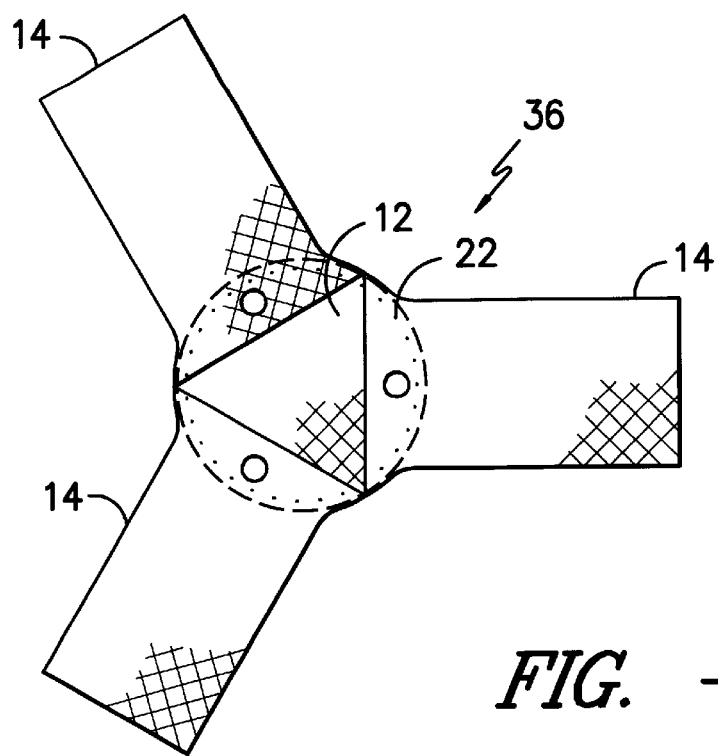
FIG. -4-
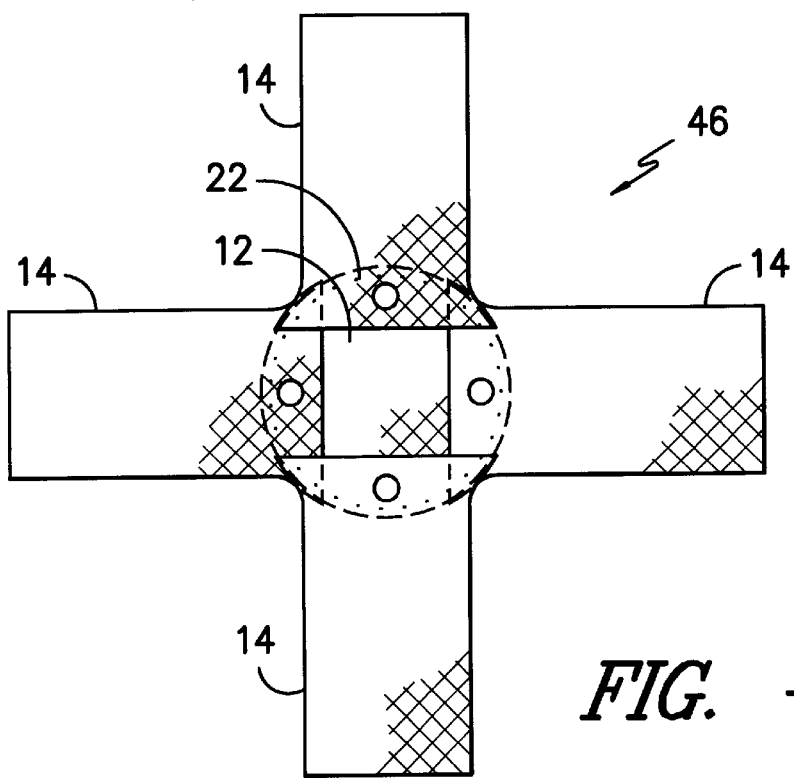
FIG. -5-

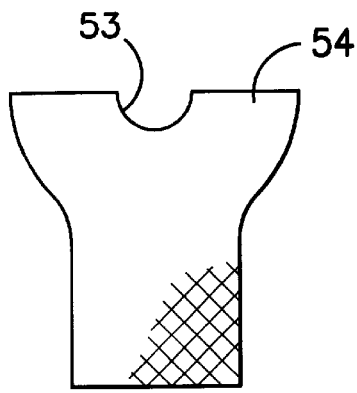
FIG. -6A-
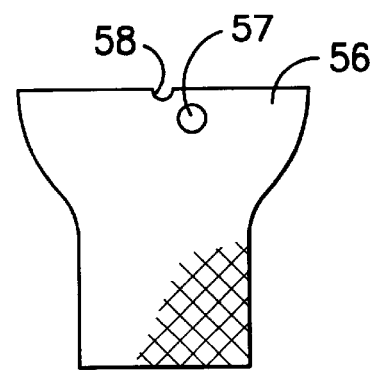
FIG. -6B-
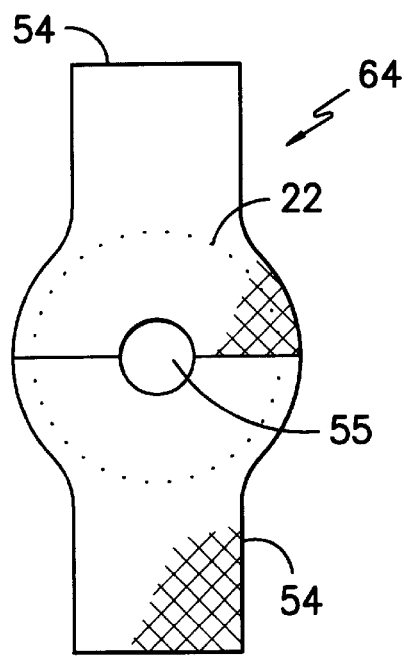
FIG. -6C-
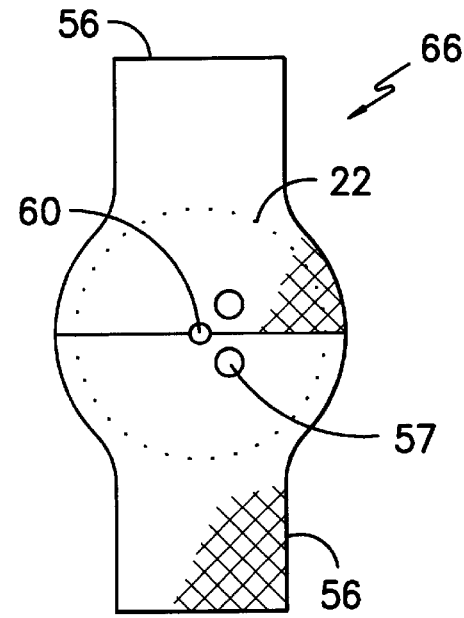
FIG. -6D-

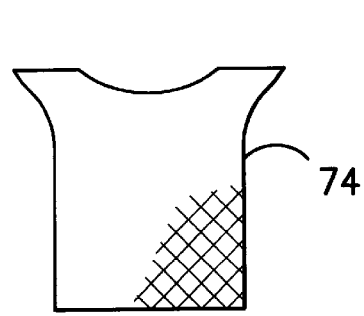
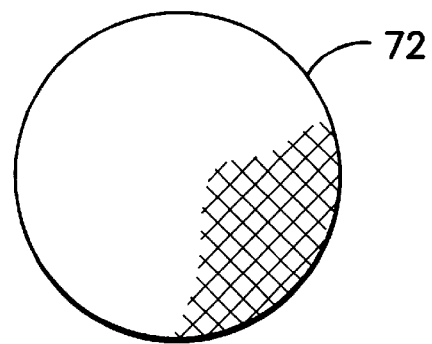
FIG. -7A-  FIG. -7B-
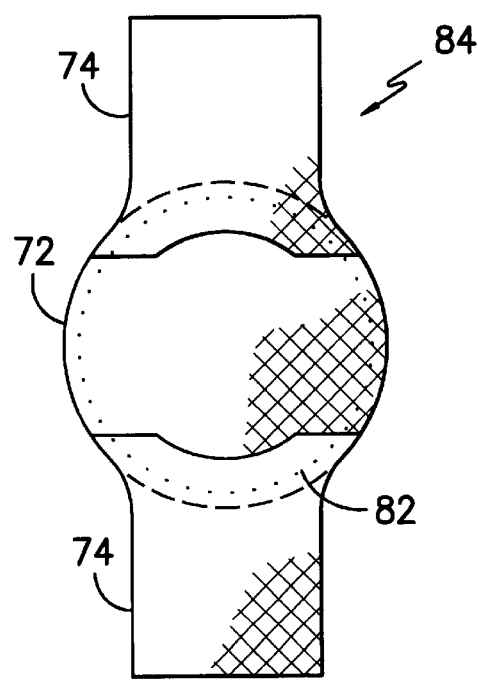
FIG. -7C-

AIR BAG TETHER SYSTEM COMPRISING MULTI-SEGMENT TETHERS

REFERENCE TO RELATED APPLICATIONS

This application is a continuation-in-part of co-pending U.S. patent application, Ser. No. 09/711,418, filed Nov. 13, 2000, titled "Multi-Segment Air Bag Tether Construction."

TECHNICAL FIELD

This disclosure relates to multi-segment air bag tether systems and to a pattern-wise arrangement of such tether segments in relation to air bag panels on a fabric blank, thus resulting in increased fabric utilization and an overall cost savings per finished air bag. The air bag tether system as described herein is comprised of two multi-segment congruent tether groups that are joined to one another and to a respective air bag panel. The segments that comprise each tether group are cut substantially on the bias with respect to the warp or the fill of the fabric blank. This multi-segment construction decreases the amount of fabric that is used in the manufacture of the air bag and tether systems, while providing sufficient elongation for the tether system to be functional.

BACKGROUND

Because of the speed with which an air bag inflates, it is necessary for the protection of vehicle occupants to control the volume of space that the air bag occupies in the vehicle cabin. Traditionally, air bag tethers have been used to control the excursion of an air bag as it inflates. As gas is released, causing the air bag to rapidly inflate, it is necessary to keep such inflation from occurring in an uncontrolled manner. Tethers, which are sewn to the interior portions of the front and rear panels of an air bag, keep the inflating air bag from expanding so rapidly as to adversely affect the safety of the vehicle occupant, as the vehicle occupant contacts the air bag.

Tethers are conventionally strip-shaped pieces of fabric that are aligned in pattern-wise arrangement on a fabric blank, or that are aligned in relation to air bag panels that may be cut from the same blank. These tethers typically include a circular portion in the center area of the tether strip used for attachment of the tether strip to the air bag panel. It is understood in the industry that such tethers should have a capacity for elongation (that is, the tethers should be able to stretch to accommodate the rapid excursion of the bag). For this reason, conventional strip-shaped tethers have historically been cut on the bias with respect to the warp and fill of the fabric. However, utilizing these one-piece tethers increases the amount of fabric needed to create an appropriate number of tethers for a plurality of air bags, thus resulting in increased production costs.

SUMMARY

The present air bag tether system, with groups of tether segments attached to each bag panel, addresses the problems of fabric utilization and tether elongation. Using a multi-segment tether system in place of conventional one-piece tethers improves fabric utilization by allowing these bias-cut tether segments to be arranged around air bag panels into spaces that might otherwise be considered fabric waste. The segments that comprise the tether groups are each cut substantially on a bias with respect to the warp and fill of the fabric blank. This multi-segment approach, rather than one-piece tethers, leads to an improved fabric utilization, while providing a tether system that is capable of sustaining the forces exerted by the inflating air bag.

BRIEF DESCRIPTION OF THE DRAWINGS

FIG. 1 shows a side view of an air bag comprised of a front bag panel and a rear bag panel;

FIG. 2 shows a cross-sectional view of the air bag of FIG. 1, revealing a tether system incorporated therein;

FIG. 3A shows a plan view of a tether segment of the present invention that is cut substantially on the bias with respect to the warp or fill of a fabric blank;

FIG. 3B shows a plan view of a circular reinforcement as may be included in the air bag tether system of the present invention;

FIG. 3C shows a plan view of a multi-segment tether group, as comprised of two of the tether segments of FIG. 3A and the circular reinforcement of FIG. 3B;

FIG. 3D shows a plan view of a multi-segment tether group, in which two of the tether segments of FIG. 3A are attached to an air bag panel by a circular seam, but without the inclusion of the circular reinforcement of FIG. 3B;

FIG. 4 shows a plan view of a multi-segment tether group that is suitable for attachment to an air bag panel and that is comprised of three of the tether segments of FIG. 3A and the circular reinforcement of FIG. 3B;

FIG. 5 shows a plan view of a multi-segment tether group that is suitable for attachment to an air bag panel and that is comprised of four of the tether segments of FIG. 3A and the circular reinforcement of FIG. 3B;

FIG. 6A shows a plan view of an alternate pattern for the tether segment of the present invention, as would be attached to the front panel of an air bag;

FIG. 6B shows a plan view of an alternate pattern for the tether segment of the present invention, as would be attached to the rear panel of an air bag;

FIG. 6C shows a plan view of a multi-segment tether group, as comprised of two of the tether segments of FIG. 6A, as would be attached to the front panel of an air bag;

FIG. 6D shows a plan view of a multi-segment tether group, as comprised of two of the tether segments of FIG. 6B, as would be attached to the rear panel of an air bag;

FIG. 7A shows a plan view of yet another alternate pattern for a tether segment of the present invention;

FIG. 7B shows a plan view of a circular reinforcement as may be included with the tether segments of FIG. 7A; and FIG. 7C shows a plan view of a multi-segment tether group, as comprised of two of the tether segments of FIG. 7A and the circular reinforcement of FIG. 7B, as would be attached to an air bag panel.

DETAILED DESCRIPTION

In order to describe the invention, it is necessary that certain terms be defined. The term "substantial bias" is intended to refer to a cut made diagonally across the weave of a fabric at an angle of 25 to 65 degrees with respect to the warp and fill. The term "front" shall refer to that portion of an air bag that is nearest a vehicle occupant, while the term "rear" shall refer to those portions of an air bag that are furthest from the vehicle occupant (e.g., in the case of front-seat air bags, nearest the windshield). The term "tether segment" refers to a component of a tether system that is attached to a first air bag panel and to a tether segment that is attached to the second air bag panel (for instance, a tether segment on the front bag panel is attached to a corresponding tether segment on the rear bag panel). Each tether segment is cut on the bias with respect to the warp and fill of a textile fabric. The term "ether group" shall refer to two or more tether segments attached to an air bag panel, with or without the inclusion of a reinforcement between them. The term "tether system" shall refer to a pair of tether groups joined along their respective end portions, which in combination succeed in preventing the uncontrolled excursion of an inflating air bag from adversely affecting a vehicle occupant with whom such a bag comes into contact.

Turning now to the Figures, FIG. 1 shows a side view of an air bag 10. Air bag 10 is comprised of a front bag panel 4 and a rear bag panel 6, panels 4 and 6 being substantially circular, although other panel geometries could also be used.

FIG. 2 shows a cross-sectional view of air bag 10, revealing the arrangement of a tether system therein. Tether segments 14 (shown in FIG. 3A as being cut substantially on the bias with respect to the warp or the fill of a fabric blank) are attached to front bag panel 4 and rear bag panel 6. Tether segments 14 are shown in lapped fashion in the interior of air bag 10. The joining of tether segments 14 is shown as being achieved by means of rectangular seam 18, but such joining may be accomplished by any other means, such as welding, gluing, or other seaming techniques. Tether segments 14 are substantially rectangular in shape, each having one flared end which is positioned toward the center area of respective bag panels 4, 6.

Reinforcement 12 (shown in FIG. 3B) may also be attached to front bag panel 4, as well as rear bag panel 6. It is common for reinforcements, having a circular or other shape, to be used in the production of air bags 10. Reinforcements 12 may be circular in shape or may, for example, be in the shape of an n-sided polygon (where n is in the range of 4 to 12). In one embodiment, reinforcements 12 are included with tether segments 14 to form tether panel 24. Such reinforcements 12 are particularly important in preventing tears around the mouth of air bag 10, at the location of the inflation media.

Tether segment 14 is part of a multi-segment tether panel 24 that is shown in FIG. 3C. Tether panel 24 is comprised of two tether segments 14 and at least one reinforcement 12. Tether segments 14 and reinforcement 12 are secured to one another and to a bag panel 4 or 6 by seam 22, as indicated by a dotted line in FIG. 3C. It should be noted that tether segments 14 are cut substantially on the bias with respect to the warp or the fill of a fabric blank. The angle of the bias cut should be in the range of 25 to 65 degrees, and preferably an angle of about 45 degrees.

FIG. 3D shows a variation of tether panel 24 of FIG. 3C. In this embodiment, reinforcement 12 is omitted. Tether segments 14 are attached to bag panel 4 or 6 by means of seam 22. In this variation, tether segments 14 do not contact one another, but nevertheless act in cooperation with one another and bag panel 4 (not shown) to form tether group 28.

Turning now to FIG. 4, a three-segment tether panel 36 is shown. Three-segment tether 36 is comprised of three tether segments 14 and reinforcement 12. Tether segments 14 and reinforcement 12 may be secured to bag panel 4 or 6 by means of seam 22. Three-segment tethers 36 are useful for reducing bag oscillation during deployment.

FIG. 5 shows a four-segment tether panel 46. Four-segment tether panel 46 is comprised of four tether segments 14 and reinforcement 12. Seam 22 secures tether segments 14 and reinforcement 12 to bag panel 4 or 6. Four-segment tether panels 46 have an even greater ability to reduce oscillation during bag deployment.

FIG. 6A shows a variation of tether segment 14. Front tether segment 54 has a widened end portion that eliminates the need for reinforcement 12. An arc 53 in the central portion of the widened end provides half of what will be an opening 55 in front tether 64 (see FIG. 6C). Opening 55 is useful for alignment of segments 54. Seam 22 may be used to attach tether segments 54 to front bag panel 4 to create front tether panel 64.

FIG. 6B shows a variation of tether segment 14, as would be attached to rear bag panel 6. Rear tether segment 56 has a widened end, similar to that of front tether segment 54. Rear tether segment 56 is also cut on the bias with respect to the warp and fill of a fabric blank. Tether segment 56 has a small arc 58 in the central portion of the widened end, which provides half of what will be an opening 60 in rear tether panel 66 (see FIG. 6D). Opening 60 is used to insert inflation media into the air bag. Tether segment 56 also has a ventilation opening 57 that is also present in rear tether panel 66. Again, seam 22 may be used to secure tether segments 56 to rear bag panel 6. Reinforcement 12 is not necessary, but may be used for additional support, if desired.

FIG. 7A shows yet another variation of tether segment 14. Tether segment 74 has an arced end portion and is slightly truncated in comparison to tether segment 14. Like tether segment 14, tether segment 74 also is cut substantially on the bias with respect to the warp and fill of a fabric blank.

FIG. 7B shows a reinforcement 72 as may be used with tether segment 74. As illustrated in FIG. 7C, tether panel 84 is comprised of two tether segments 74 and reinforcement 72. Seam 82 may be used to secure tether segments 74 and reinforcement 72 to one another and to bag panel 4 or 6. Like reinforcement 12, reinforcement 72 may be circular in shape or may be in the shape of an n-sided polygon (where n is in the range of 4 to 12).

The multi-segment tether system of the present invention includes multiple tether segments 14 (or alternately 54 or 74) and may or may not include reinforcements 12 (or alternately 72). These tether segments 14 are positioned with one end portion secured to the central area of bag panel 4 or 6 and one end portion directed toward the periphery of bag panel 4 or 6. The tether system is formed by joining the periphery end portions of tether segments 14 that are attached to front bag panel 4 to the periphery end portions of tether segments 14 that are attached to rear bag panel 6. Although sewing is a preferred means of attaching tether system components (e.g., seams 18, 22, and 82), other attachment means can be employed, such as welding, gluing, and the like.

By incorporating these various multi-segment tether systems, the present invention represents a useful advancement over the prior art.

I claim:

1. An air bag comprising a front bag panel and a rear egg panel, said bag panels having a central area and a periphery area, said air bag further comprising a tether system positioned between said front bag panel and said rear bag panel, said tether system comprising a first group of tether components and a second group of tether components, all of said tether components having substantially the same size and shape, wherein each of the tether components of said first group has a bag attachment end portion that is attached to the central area of said front bag panel and a tether attachment end portion that is positioned toward the periphery of said front bag panel, and wherein each of the tether components of said second group has a bag attachment end portion that is attached to the central area of said rear bag panel and a tether attachment end portion that is positioned toward the periphery of said rear bag panel, and wherein the tether attachment end portions of said first group of tether components are attached to the tether attachment end portions of said second group of tether components, each of said first and second groups of tether components being cut from a textile fabric having a group of warp yarns and a group of fill yarns, said tether components being cut substantially on a bias of between 25 degrees and 65 degrees with respect to one of said groups of yarns.

2. The air bag of claim 1 wherein said first group of tether components has a first and a second tether component, the bag attachment end portion of said first tether components being positioned around the central area of said front bag panel in opposed relation to the bag attachment end portion of said second tether components, the bag attachment end portions of said first and second tether components being attached to said front bag panel, and wherein said second group of tether components has a third and a fourth tether component, the bag attachment end portion of said third tether components being positioned around the central area of said rear bag panel in opposed relation to the bag attachment end portion of said fourth tether components, the bag attachment end portions of said third and fourth tether components being attached to said rear bag panel.

3. The air bag of claim 1 wherein said first group of tether components has three tether components that are positioned around the central area of said front bag panel such that the tether attachment end portions of said tether components form the vertices of a triangle and wherein said second group of tether components has three tether components that are positioned around the central area of said rear bag panel such that the tether attachment end portions of said tether components form the vertices of a triangle.

4. The air bag of claim 3 wherein the tether attachment end portions of said tether components form the vertices of an equilateral triangle.

5. The air bag of claim 1 wherein said first group of tether components has four tether components, said four tether components having bag attachment end portions that are positioned as opposed pairs around the central area of said front bag panel, the bag attachment end portions of said first group of tether components being attached to said front bag panel, and wherein said second group of tether components has four tether components, said four tether components having bag attachment end portions that are positioned as opposed pairs around the central area of said rear bag panel, the bag attachment end portions of said second group of tether components being attached to said rear bag panel.

6. The air bag of claim 1 wherein said tether components are cut at a 45 degree bias.

7. The air bag of claim 1 wherein the bag attachment end portions of said tether its components are attached to said bag panels by sewn seams.

8. The air bag of claim 1 wherein the periphery end portions of said first group of tether components are attached to the tether attachment end portions of said second group of tether components by sewn seams.

9. The air bag of claim 1 wherein said tether system further comprises at least one reinforcement positioned at the central area of said bag panels, said reinforcement being attached to the bag attachment end portions of said tether components.

10. A tether group to be used in a tether system of an air bag, said tether group comprising at least two tether components having substantially the same size and shape, wherein each of said tether components has a bag attachment end portion and a tether attachment end portion, the bag attachment end portions being positioned in opposed relation to one another, and wherein each of said tether components is cut from a textile fabric having a group of warp yarns and a group of fill yarns, said tether segments being cut substantially on a bias of between 25 degrees and 65 degrees with respect to one of said groups of yarns.

11. The tether group of claim 10 wherein said tether group comprises two tether components whose bag attachment end portions are positioned in opposed relation to one another.

12. The tether group of claim 11 wherein said tether group comprises three tether components whose bag attachment end portions form the vertices of a triangle.

13. The tether group of claim 10 wherein said tether group comprises four tether components whose bag attachment end portions are positioned as opposed pairs.

* * * * *